United States Patent [19]
Shephard

[11] Patent Number: 5,704,870
[45] Date of Patent: Jan. 6, 1998

[54] ANGULAR ADJUSTMENT MECHANISMS

[76] Inventor: Philip Charles Shephard, 38 Stonor Road, Hall Green, Birmingham B28 0QR, United Kingdom

[21] Appl. No.: 649,867

[22] Filed: May 13, 1996

[30] Foreign Application Priority Data

May 27, 1995 [GB] United Kingdom ............... 9510855

[51] Int. Cl.⁶ ....................................................... F16H 1/32
[52] U.S. Cl. ............................................................ 475/342
[58] Field of Search ...................................... 475/342, 344

[56] References Cited

U.S. PATENT DOCUMENTS

| | | | |
|---|---|---|---|
| 1,431,167 | 10/1922 | McCollum | 475/342 |
| 3,792,629 | 2/1974 | Applebury | 475/344 |
| 4,301,693 | 11/1981 | Stanely | 475/342 |
| 4,345,792 | 8/1982 | Shepard | 475/342 |
| 4,882,943 | 11/1989 | Pipon et al. | 475/342 |
| 5,090,771 | 2/1992 | Kawakita | 475/342 |
| 5,240,462 | 8/1993 | Mochizuki et al. | 475/342 |
| 5,462,498 | 10/1995 | Lindblad | 475/342 |
| 5,588,932 | 12/1996 | Lindblad | 475/342 |

FOREIGN PATENT DOCUMENTS

| | | |
|---|---|---|
| 1140448 | 2/1983 | Canada. |
| 0332340 A1 | 9/1989 | European Pat. Off.. |
| 1528357 | 10/1978 | United Kingdom. |
| 2051220 | 1/1981 | United Kingdom. |

*Primary Examiner*—Dirk Wright
*Attorney, Agent, or Firm*—Davis and Bujold

[57] ABSTRACT

An angular adjustment mechanism for adjusting the angular displacement of a seat back relative to a seat cushion has first and second internal toothed ring gears, the first and second ring gears being interconnected and adapted to be secured to the seat back, a third internally toothed ring gear being mounted intermediate of and rotatable relative to the first and second ring gears, said third ring gear being adapted to be secured to the seat cushion frame, the first, second and third ring gears being of the same diameter, the first and second ring gears having equal numbers of teeth and the third ring gear having a different number of teeth; a control gear being located axially within the first, second and third ring gears, and at least one planet gear being located in meshing engagement with the control gear and with the first, second and third ring gears, a tooth on each of the first and second ring gears being aligned with a tooth on the third ring gear at the point of meshing of the planet gear.

17 Claims, 3 Drawing Sheets

ANGULAR ADJUSTMENT MECHANISMS

BACKGROUND TO THE INVENTION

The present invention relates to angular adjustment mechanisms and in particular, although not exclusively, to mechanisms for adjusting the inclination between the seat back and seat cushion of vehicle seats.

British Patent Specification 1,528,357 discloses a seat reclining mechanism comprising a pair of internally toothed ring gears, one fixed to the seat back and the other to the seat cushion frame. The ring gears are mounted in juxtaposed relationship coaxially of one another, one ring having twenty-one teeth and the other twenty-five teeth. A control gear is mounted coaxially of the ring gears and is drivingly connected to a hand wheel. Four planet gears are disposed angularly at 90° between the control gear and the ring gears, the teeth of the ring gears coming into alignment where they are engaged by the planet gears.

With this mechanism, rotation of the control gear will cause the planet gears to rotate bringing different pairs of teeth of the ring gears into alignment and thereby causing angular adjustment of one ring gear relative to the other.

With such mechanisms, loads applied to the seat back must be withstood by the four shear points defined by the points of contact of the planet gears with the ring gears. Typically, the strength of these mechanisms is of the order of 1500 Nm and even if such mechanisms are used in pairs, one on either side of the seat, they are not capable of withstanding the forces of up to 30 g, which may be experienced when an occupant is thrown rearwards if the vehicle is subject to a vicious rear end collision or a rear passenger is thrown forwards in a front end collision.

Furthermore, seat belt design may be optimised to take account of the seat position and inclination, if the seat belt is anchored to the seat. This is not possible with seat reclining mechanisms of the type described above as they are not capable of transmitting the loads that may be encountered.

The present invention provides an angular adjustment mechanism of improved strength, which may be tailored to provide appropriate load withstanding capabilities for any particular application.

SUMMARY OF THE INVENTION

According to one aspect of the present invention an angular adjustment mechanism for adjusting the angular displacement of one component relative to another, comprises first and second internal toothed ring gears, the first and second ring gears being interconnected and adapted to be secured to one component, a third internally toothed ring gear being mounted intermediate of and rotatable relative to the first and second ring gears, said third ring gear being adapted to be secured to the other component; the first, second and third ring gears being of the same diameter, the first and second ring gears having equal numbers of teeth and the third ring gear having a different number of teeth; a control gear being located coaxially within the first, second and third ring gears, and at least one planet gear being located in meshing engagement with the control gear and with the first, second and third ring gears, a tooth on each of the first and second ring gears being aligned with a tooth on the third ring gear at the point of meshing of the planet gear.

With the above mechanism, when the control gear is rotated it will drive the planet gear altering the point of meshing of the planet gear with the first, second and third ring gears, thereby causing the third ring gear to rotate relative to the first and second ring gears, so that a different tooth of the third ring gear becomes aligned with teeth of the first and second ring gears at the point of meshing.

The use of interconnected first and second ring gears in the manner disclosed above, will double the number of shear points through which loads are transmitted thereby significantly improving the strength of the mechanism. Further improvements in strength may be achieved by further increasing the number of ring gears associated with each of the components.

BRIEF DESCRIPTION OF THE DRAWINGS

The invention is now described by way of example only, with reference to the accompanying drawings, in which.

DESCRIPTION OF A PREFERRED EMBODIMENT

Figure 1:
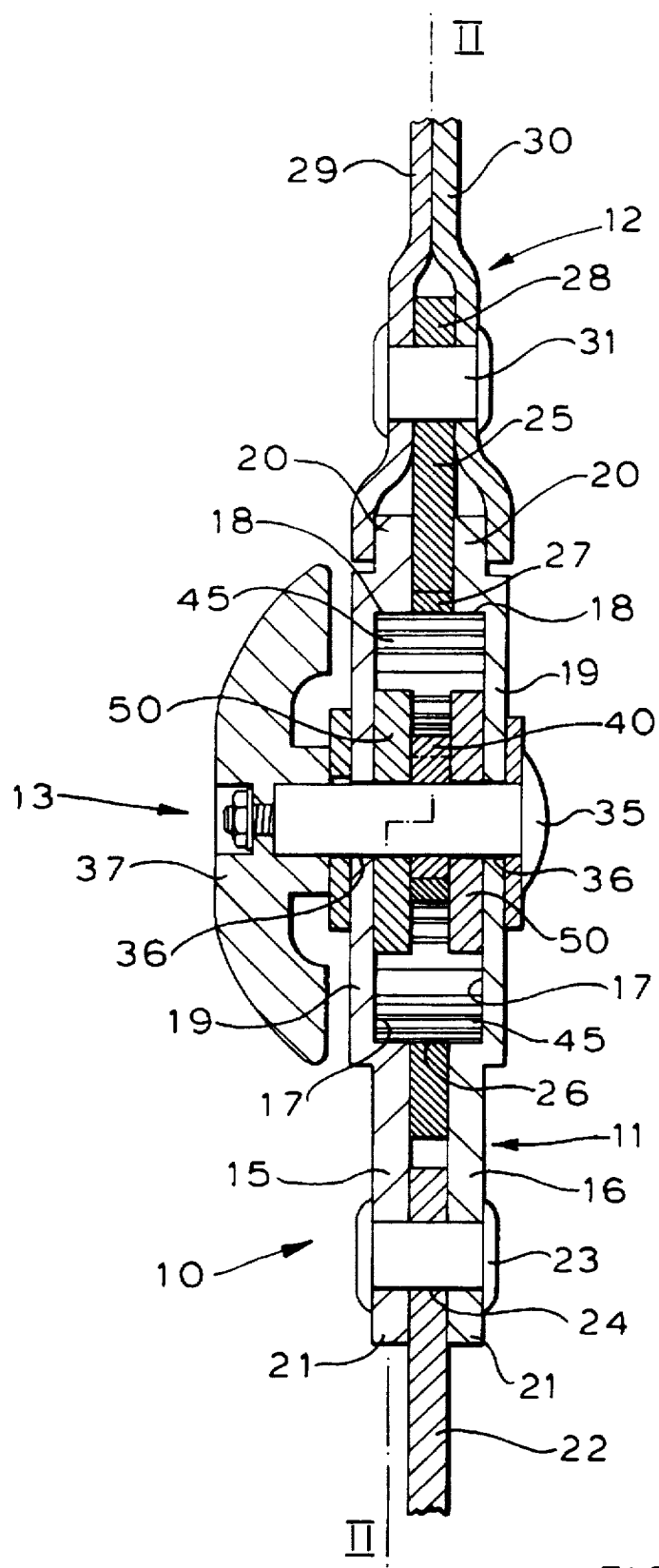
FIG. 1 illustrates in section taken along the line I—I of FIG. 2, an angular adjusting mechanism in accordance with the present invention.
Figure 2:
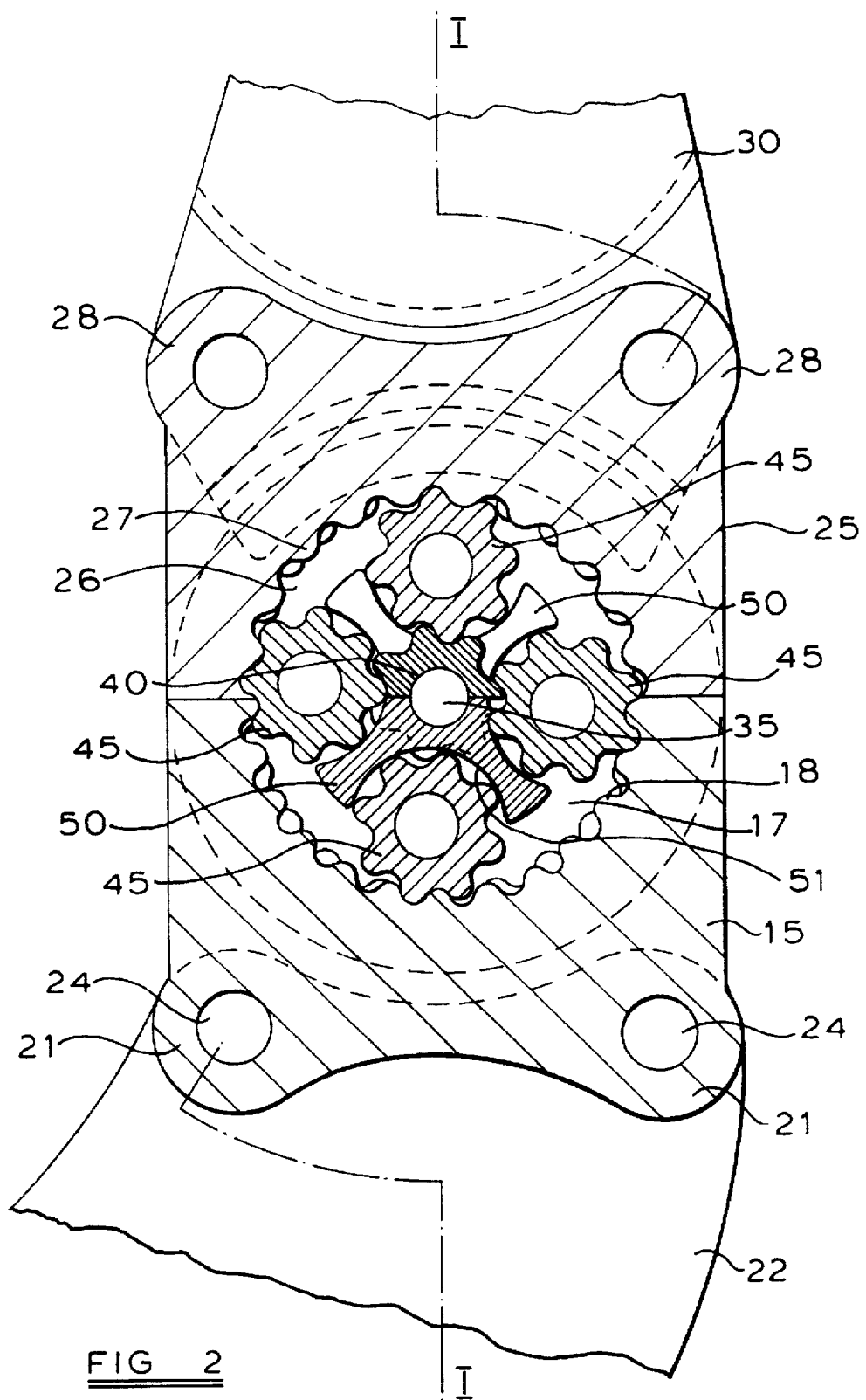
FIG. 2 shows a section along the line II—II of FIG. 1.

FIGS. 1 and 2 illustrate a seat reclining mechanism 10 by which a seat back may be adjusted angularly with respect to a seat cushion.

The seat reclining mechanism 10 comprises a pair of assemblies 11 and 12, one assembly 11 being adapted to be secured to the seat cushion frame and the other assembly 12 being adapted to be secured to the seat back, the assemblies 11 and 12 being hinged together and an adjustment mechanism 13 being provided to effect relative pivotal adjustment therebetween.

Assembly 11 comprises a pair of plates 15 and 16, each having a circular recess 17 around the periphery of which is formed an internal ring gear 18, each ring gear 18 having twenty-one teeth. The circular recess 17 may be formed by a semi shearing process, in which the portion 19 of the plate 15, 16 defining the base of the recess 17, is pressed out of the plane of the plate 15, 16 to define the recess 17, the displaced portions 19 remaining an integral part of the plates 15, 16 and defining end plates for the adjustment mechanism 13. Alternatively portion 19 of the plates 15 and 16 may be removed completely to define apertures, the periphery of which define the ring gears 18. Separate end plates may then be secured to the plates 15 and 16 in suitable manner, to provide a closure for the adjusting mechanism 13. The outer portion 20 of the plates 15, 16 defines a flange, a pair of lugs 21 being provided on the portion 20, to one edge of the plates 15 and 16.

The plates 15 and 16 are secured together with a spacer plate 22 therebetween, by means of rivets 23 which extend through holes 24 in the lugs 21, the recesses 17 in the plates 15 and 16 being disposed on the insides of the plates 15 and 16 and coaxially of one another. The spacer plate 22 may be used to secure the assembly 11 to the frame of the seat cushion, in suitable manner.

The plates 15 and 16 are preferably of symmetrical configuration, plate 15 being identical to plate 16, one being reversed relative to the other.

3

The assembly 12 comprises a single plate 25 having an aperture 26 corresponding in diameter to the recesses 17 of plates 15 and 16. The internal diameter of aperture 26 is provided with an internal ring gear 27, having twenty-five teeth. The plate 25 is located intermediate of the plates 15 and 16 so that the aperture 26 is coaxial with the recesses 17. The plate 25 is slightly thinner than the spacer plate 22 so that the plate 25 is movable relative to the plates 15 and 16.

The plate 25 has a pair of lugs 28 by which a pair of joggle plates 29 and 30 are secured to the plate 25 by rivets 31. The joggle plates 29 and 30 overlie the outer portion 20 of plates 15 and 16 to prevent the plates 15 and 16 from opening on the side opposite to the rivets 23. The joggle plates 29 and 30 may be used to secure the assembly 12 to the seat back, in suitable manner.

A drive shaft 35 is rotatably mounted through central apertures 36 in the portions 19 of plates 15 and 16, so that it is disposed coaxially of the ring gears 18 and 27. One end of the shaft 35 is connected to a hand wheel 37 or other form of drive means, for example, an electric motor, by which it may be rotated. A gear 40 is mounted on shaft 35 for rotation therewith. The gear 40 meshes with four planet gears 45 which are disposed angularly at 90° to one another about the gear 40. The planet gears 45 also mesh with the ring gears 18 and 27 of plates 15, 16 and 25, a tooth of ring gear 27 being aligned with teeth of the ring gears 18 at each point of contact with one of the planet gears 45. A pair of cruciform members 50 are rotatably mounted on the drive shaft 35 on either side of gear 40, the cruciform members 50 having part circular shaped pockets 51 in which are engaged the planet gears 45 and which maintain the angular separation of the planet gears 45. The cruciform members 50 also hold the planetary gears 45 on the correct rolling radius for minimum backlash and act as a brake to stop inadvertent rotation when loads are applied to the mechanism.

The planet gears 45 are retained axially between the portions 19 of the plates 15 and 16.

In operation, rotation of the shaft 35 will cause the gear 40 to drive the planet gears 45. Movement of the planet gears 45 causes rotation of plate 25 relative to plates 15 and 16, so that the teeth of ring gears 18 and 27 may be brought into alignment as they mesh with the planet gears 45, in the manner disclosed in British Patent Specification 1,528,357.

With the arrangement disclosed above, the number of shear points through which loads are transmitted through the seat back to the seat cushion frame and thence to the vehicle structure, is doubled from four to eight as compared with the mechanism disclosed in British Patent Specification 1,528, 357. The strength of the mechanism will consequently be significantly improved. Furthermore, as compared to the mechanism disclosed in British Patent Specification 1,528, 357, the planet gears 45 are supported adjacent each extremity in trunnion like manner, which will result in smoother operation of the mechanism.

Figure 3:
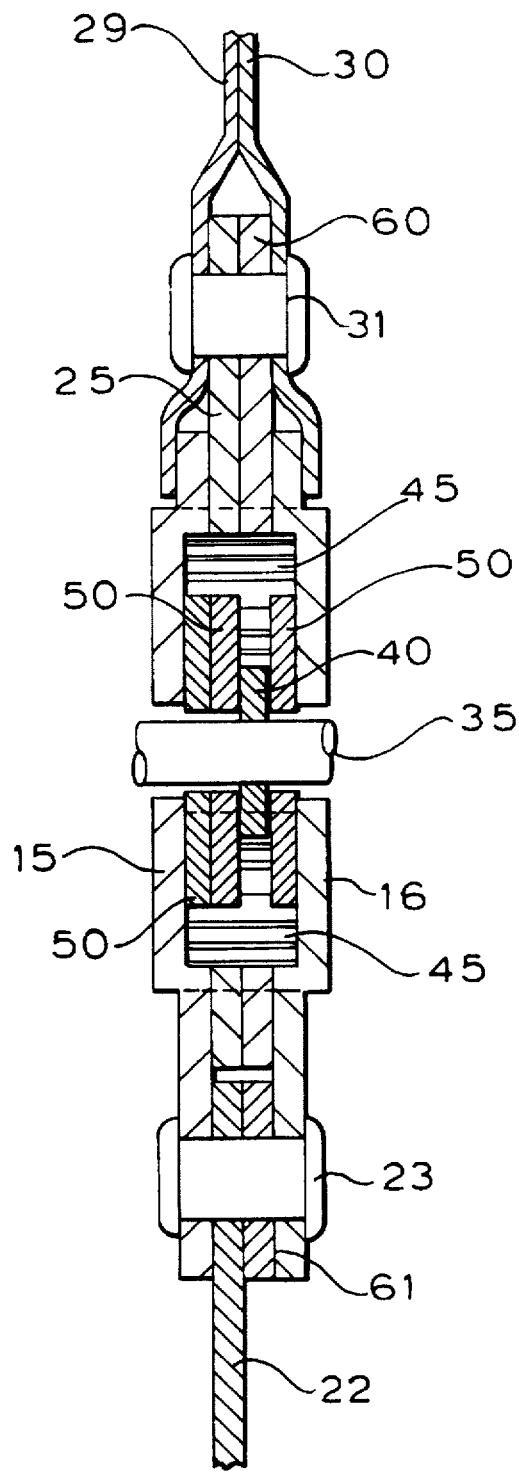
FIG. 3 illustrates diagramatically in similar view to FIG. 1, a modification to the embodiment illustrated in FIGS. 1 and 2.

In order to improve the strength of the seat reclining mechanism still further, a fourth plate 60 may be added as illustrated in FIG. 3. In this embodiment, the fourth plate 60 is identical to plate 25 and is secured thereto by rivets 31. The loads applied to the plate 25 are thereby spread over the plates 25 and 60.

In order to accommodate the additional plate 60, a further space plate 61 of the same thickness as plate 60 is located between plates 15 and 16 and the length of the planet gears 45 is increased by the thickness of plate 60. Also an additional cruciform member 50 of the same thickness as plate 60 is rotatably mounted on shaft 35. In this embodiment rather than a third cruciform member 50, an additional gear 40 may alternatively be mounted on shaft 35 for rotation therewith.

4

Further improvement in the strength of the mechanism may be achieved by adding still further plates. Preferably, the plates are arranged such that plates secured to one component alternate with those secured to the other component, as illustrated in FIG. 4.

Figure 4:
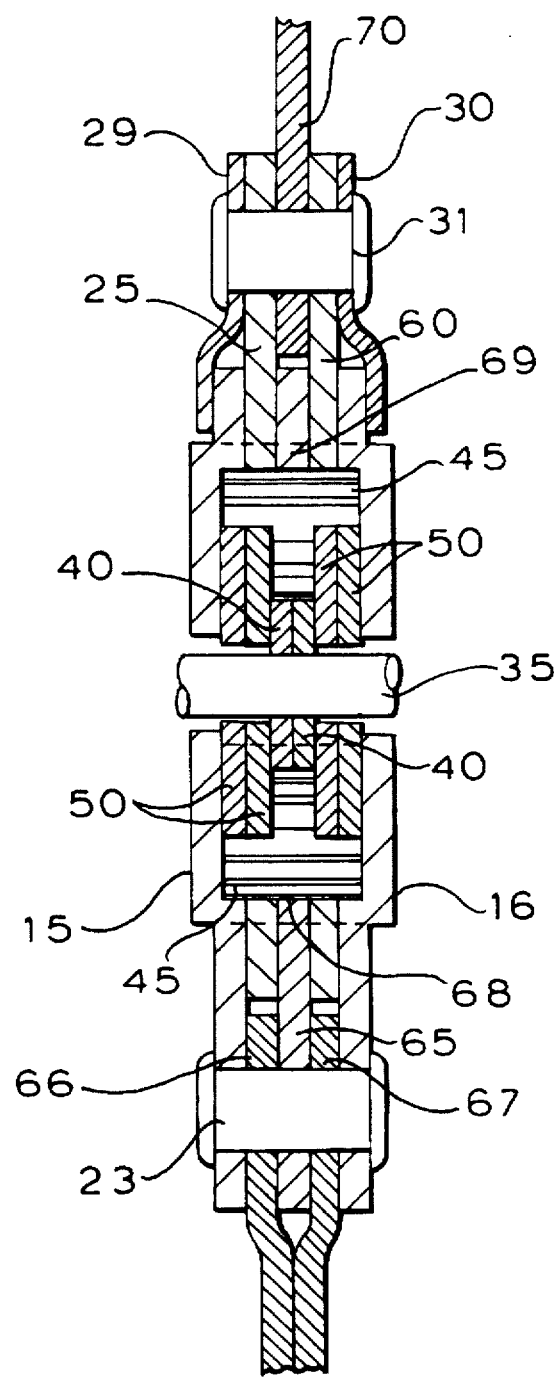
FIG. 4 illustrates diagramatically in similar view to FIG. 1, a further modification to the embodiment illustrated in FIG. 3.

In the embodiment illustrated in FIG. 4, a fifth plate 65 is added to the assembly 11 secured to the seat cushion frame. This fifth plate 65 is secured between the outer plates 15 and 16 with spacer plates 66 and 67 therebetween. The fifth plate 65 has a central aperture 68 corresponding to the recesses 17 of the plates 15 and 16 and having an internal ring gear 69 identical to the ring gears 18 of plates 15 and 16. The third and fourth plates 25 and 60 are also separated by spacer plate 70, so that the third plate 25 is disposed between end plate 15 and fifth plate 65 and the fourth plate 60 is disposed between the fifth plate 65 and end plate 16.

In similar manner to the embodiment illustrated in FIG. 4, the planet gears 45 are lengthened and additional cruciform members 50 and/or gears 40 added to take account of the thickness of the additional plate 65.

With this embodiment, the number of shear points is increased from eight to sixteen again further increasing the strength of the mechanism.

The above examples are given by way of example only and it will be appreciated that mechanisms with even more plates may be used.

Various modifications may be made without departing from the invention. For example, while in the above embodiments four planet gears are used, the mechanism will function with any number of planet gears, although a symmetrical arrangement of three or more planet gears is preferable. The number of teeth on the ring gears associated with one component must differ from those on the ring gear(s) associated with the other component, by the number of planet gears or a multiple thereof.

While in the above embodiments, the angular adjustment mechanism has been used as a seat reclining mechanism, it will be appreciated that the mechanism may be used for the angular adjustment of any component relative to another component.

I claim:

1. An angular adjustment mechanism for adjusting the angular displacement of one component relative to another component comprising at least three plates located in juxtaposed relationship, first and second outer plates being secured together and to said one component and a third plate being disposed between said first and second plates and being secured to said other component, the plates defining gear rings of equal diameter which are located coaxially of one another, the gear rings defined by the first and second plates having equal numbers of teeth and the gear ring defined by the third plate having a different number of teeth, a control gear being located coaxially of the gear rings and at least one planet gear being located in meshing engagement with the control gear and with the gear rings, a tooth on each of the gear rings defined by the first and second plates being aligned with a tooth on the gear ring defined by the third plate at the point of meshing of the planet gear, and the planet gear being located angularly by means of a support plate mounted for rotation coaxially of the control gear.

2. An angular adjustment mechanism according to claim 1 in which additional internally toothed ring gears are associated with said one or said other component, additional ring gears associated with said one component having equal numbers of teeth to the first and second ring gears and additional ring gears associated with said other component having equal numbers of teeth to the third ring gear.

3. An angular adjustment mechanism according to claim 2 in which the additional ring gears are defined by plates, each plate having an aperture, the ring gear being formed about the periphery of the aperture.

4. An angular adjustment mechanism according to claim 1 in which a fourth plate is located between the first and second plates, the fourth plate being secured to the third plate and defining a ring gear with a number of teeth equal to that of the third ring gear.

5. An angular adjustment mechanism according to claim 1 in which additional ring gears are located between the first and second ring gears, so that alternate ring gears are connected to said one and to said other components.

6. An angular adjustment mechanism according to claim 1 in which a fourth plate having an aperture defining a fourth ring gear identical to the first and second ring gears, is located between the first and second plates, and is secured thereto so that the portion of the fourth plate defining the fourth ring gear is spaced from the portions of the first and second plates defining the first and second ring gears, a fifth plate defining a fifth ring gear identical to the third ring gear, is secured to the third plate, the portion of the fifth plate defining the fifth ring gear being spaced from the portion of the third plate defining the third ring gear, the third plate being interposed between the first plate and the fourth plate and the fifth plate being interposed between the fourth plate and the second plate, the ring gears being disposed coaxially of one another.

7. An angular adjustment mechanism according to claim 1 in which the first and second ring gears are defined by first and second plates, the first and second plates being formed with recesses, the periphery of the recesses defining the first and second ring gears, the first and second plates being secured together so that the recesses open inwardly, the bases of the recesses forming end plates which will retain the adjustment mechanism.

8. An angular adjustment mechanism according to claim 7 in which the ring gears located between the first and second ring gear are defined by plates, apertures being formed in the plates, the periphery of the apertures defining the ring gears.

9. An angular adjustment mechanism according to claim 1 in which the first and second ring gears are defined by first and second plates, apertures being formed in the plates, the periphery of the apertures defining the first and second ring gears, separate end plates being secured to the first and second plates in suitable manner to provide a closure which will retain the adjustment mechanism.

10. An angular adjustment mechanism according to claim 9 in which the ring gears located between the first and second ring gear are defined by plates, apertures being formed in the plates, the periphery of the apertures defining the ring gears.

11. An angular adjustment mechanism according to claim 1 in which three or more planet gears are located in meshing engagement between the control gear and the ring gears, the difference in the number of teeth of the ring gears associated with said one component and those associated with said other component being equal to or a multiple of the number of planet gears.

12. An angular adjustment mechanism according to claim 11 in which the planet gears are maintained in equiangular spaced relationship relative to the control gear and the ring gears.

13. An angular adjustment mechanism according to claim 12 in which the control gear is mounted on a drive shaft for rotation therewith, one or more support plates being rotatably mounted on the drive shaft, each support plate defining a plurality of pockets each of the planet gears engaging in one of the pockets, to maintain the planet gears in the equiangular spaced relationship.

14. An angular adjustment mechanism according to claim 13 in which support plates are provided to engage the planet gears at opposite ends thereof.

15. An angular adjustment mechanism according to claim 1 in which the first and second ring gears are connected to a seat cushion frame and the third ring gear is connected to a seat back.

16. An angular adjustment mechanism for adjusting the angular displacement of one component relative to another component comprising first and second internal toothed ring gears, the first and second ring gears being interconnected and adapted to be secured to one component, a third internally toothed ring gear being mounted intermediate of and rotatable relative to the first and second ring gears, said third ring gear being securable to the other component; the first, second and third ring gears being of the same diameter, the first and second ring gears having equal numbers of teeth and the third ring gear having a different number of teeth; a control gear being located coaxially within the first, second and third ring gears, and at least one planet gear being located in meshing engagement with the control gear and with the first, second and third ring gears, a tooth on each of the first and second ring gears being aligned with a tooth on the third ring gear at the point of meshing of the planet gear;

three or more planet gears are located in meshing engagement between the control gear and the ring gears, the difference in the number of teeth of the ring gears associated with said one component and those associated with said other component being equal to or a multiple of the number of planet gears;

the planet gears are maintained in equiangular spaced relationship relative to the control gear and the ring gears; and the control gears and the support plates have a thickness equal to the thickness of the plates defining the ring gears, and one or more control gears and a plurality of support plates are mounted on the drive shaft in appropriate relationship to the number of plates defining ring gears.

17. An angular adjustment mechanism for adjusting the angular displacement of one component relative to another component comprising at least three plates located in juxtaposed relationship, first and second outer plates being secured together and to said one component and a third plate being disposed between said first and second plates and being secured to said other component, the plates defining gear rings of equal diameter which are locater coaxially of one another, the gear rings defined by the first and second plates having equal numbers of teeth and the gear ring defined by the third plate having a different number of teeth, a control gear being located coaxially of the gear rings and at least one planet gear being located in meshing engagement with the control gear and with the gear rings, a tooth on each of the gear rings defined by the first and second plates being aligned with a tooth on the gear ring defined by the third plate at the point of meshing of the planet gear, the planet gear being located angularly by means of a support plate mounted for rotation coaxially of the control gear; and a pair of joggle plates are secured one on either side of the third plate, each joggle plate engaging the outer surface of one of the first and second plates to retain the three plates in juxtaposed relationship.

* * * * *